United States Patent [19]
Hamilton et al.

[11] Patent Number: 5,787,251
[45] Date of Patent: *Jul. 28, 1998

[54] METHOD AND APPARATUS FOR SUBCONTRACTS IN DISTRIBUTED PROCESSING SYSTEMS

[75] Inventors: Graham Hamilton; Michael L. Powell, both of Palo Alto; James G. Mitchell, Los Altos; Jonathan J. Gibbons, Mountain View, all of Calif.

[73] Assignee: Sun Microsystems, Inc., Palto Alto, Calif.

[ * ] Notice: The term of this patent shall not extend beyond the expiration date of Pat. No. 5,577,251.

[21] Appl. No.: 752,192

[22] Filed: Nov. 18, 1996

Related U.S. Application Data

[63] Continuation of Ser. No. 554,794, Nov. 7, 1995, Pat. No. 5,577,251, which is a continuation of Ser. No. 995,863, Dec. 21, 1992, abandoned.

[51] Int. Cl.$^6$ .................................................. G06F 13/00
[52] U.S. Cl. ...................................................... 395/200.33
[58] Field of Search ........................ 395/200.01, 200.02, 395/200.03, 200.05, 200.09, 610, 614, 616, 200.31, 200.33, 200.47, 200.49

[56] References Cited

U.S. PATENT DOCUMENTS

| | | | |
|---|---|---|---|
| 5,057,996 | 10/1991 | Cutler | 395/676 |
| 5,129,083 | 7/1992 | Cutler | 707/103 |
| 5,133,075 | 7/1992 | Risch | 707/201 |
| 5,218,699 | 6/1993 | Brandle et al. | 395/684 |
| 5,261,098 | 11/1993 | Katin et al. | 395/683 |
| 5,303,379 | 4/1994 | Khoyi et al. | 395/710 |
| 5,313,629 | 5/1994 | Abraham et al. | 707/103 |
| 5,577,251 | 11/1996 | Hamilton et al. | 395/671 |

*Primary Examiner*—Moustafa M. Meky
*Attorney, Agent, or Firm*—Erwin J. Basinski

[57] ABSTRACT

The present invention provides an elegant and simple way to provide mechanisms for invocation of objects by client applications and for argument passing between client applications and object implementations, without the client application or the operating system knowing the details of how these mechanisms work. Moreover, these mechanisms functions in a distributed computer environment with similar ease and efficiency, where client applications may be on one computer node and object implementations on another. The invention includes a new type of object, termed a "spring object," which includes a method table, a subcontract mechanism and a data structure which represents the subcontract's local private state.

22 Claims, 10 Drawing Sheets

REMOTE OBJECT INVOCATION USING SUBCONTRACT

MAJOR SPRING SYSTEM COMPONENTS

REMOTE OBJECT INVOCATION USING SUBCONTRACT

OBJECT INVOCATION ON A SINGLE MACHINE USING SUBCONTRACT

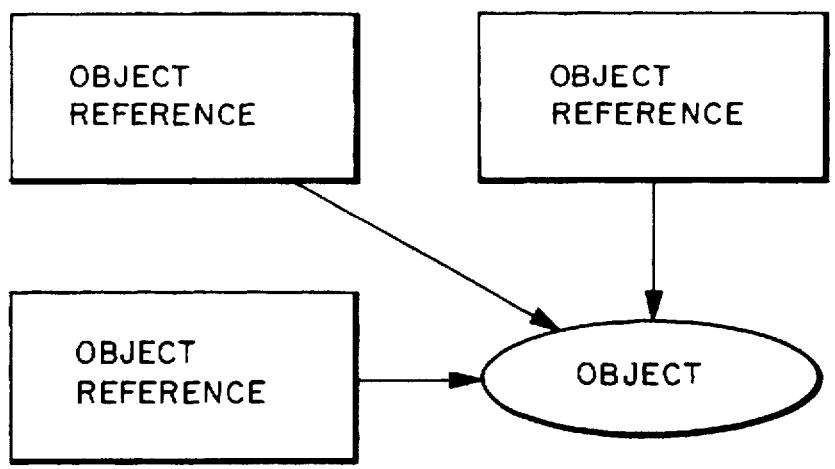
FIGURE 10A (PRIOR ART)
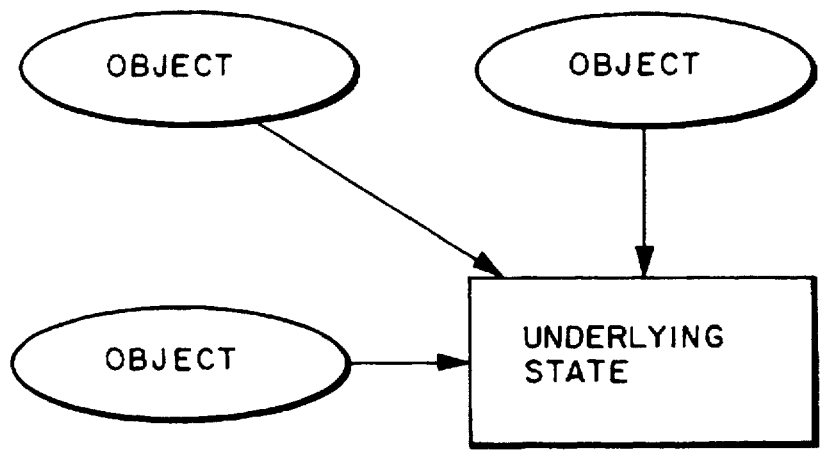
FIGURE 10B (SPRING ENVIRONMENT)

METHOD AND APPARATUS FOR SUBCONTRACTS IN DISTRIBUTED PROCESSING SYSTEMS

This is a continuation of application Ser. No. 08/554,794, filed Nov. 7, 1995, now U.S. Pat. No. 5,577,251, which is a continuation of application Ser. No. 07/995,863, filed Dec. 21, 1992 (now abandoned).

BACKGROUND OF THE INVENTION

1. Field of the Invention

The present invention relates to the fields of distributed computing systems, client-server computing and object oriented programming. Specifically, the present invention is a method and apparatus for providing program mechanisms which are independent of the operating system kernel, to handle inter-client communications involving objects.

2. Background

A key problem in Operating Systems development and maintenance is permitting the introduction of new interfaces and implementation techniques in a way which allows clients and programmers maximum flexibility without loading the operating system down with implementation details. Moreover, this problem becomes more intense when developing object oriented operating systems which have micro-kernel architectures. Micro-kernels typically permit clients to implement complex sub-systems at the client level, such as file systems, for example. Nevertheless, basic system processes such as interclient or intercomputer communications are so complex that clients and object implementors should not be concerned with these processes. That is, these inherently "system" type processes are more efficiently done by standard modules, but should be handled in a way which does not require that the base operating system is constrained by these processes.

This disclosure describes a solution to this basic problem for systems which use the object metaphor to define the interfaces between different components of a system. An elegant solution is described which allows standard modules to handle communications of object calls between remote computers which may be sending other objects as parameters of the calls.

In an object oriented system, an object is a component comprising data and operations which can be invoked to manipulate the data. The operations are invoked on the object by sending calls to the object. Each object has an object type. The object type defines the operations that can be performed on objects of that type. The object operations are implemented independent of the objects themselves. Additionally, one object type may inherit the object operations defined and implemented for other object types. For further description of object oriented design and programming techniques see "Object-oriented Software Construction" by Bertrand Meyer, Prentice-Hall 1988.

In client-server computing, typically there is a set of computers that can communicate with one another through a network connecting the computers. Some of these computers act as providers of services or functionality to other computers. The providers of such service or functionality are known as "servers", and the consumers of such service or functionality are called "clients". The client-server model also generalizes to the case where distinct programs running on the same computer are communicating with one another through some protected mechanism and are acting as providers and consumers of functionality.

In object oriented distributed systems based upon the client-server model, there exist servers that provide object oriented interfaces to their clients. These servers support objects consisting of data and the associated software. Clients may obtain access to these objects and may execute calls on them. These calls are transmitted to the server from the client. At the server these calls are executed via the software associated with the object. The results of these calls are then transmitted back to the client.

The object metaphor is a useful technique because it provides a separation between an object's interface and its implementation and because it permits multiple implementations of a single interface, which in a distributed system may reside on different machines. However, in existing object oriented systems the base system defines fundamental object properties such as what object "invocation" means, what it means to "pass an object as an argument", etc.

Unfortunately, by letting the base system define what the fundamental properties are, the base system is required to support all those fundamental properties that we wish objects to have. For example, assume that we wish to support object replication so as to increase reliability. It is not desirable for client application code to do extra work in order to talk to replicated objects. Therefore it would be preferable to support replication by the system. But there are lots of ways of implementing replication. The question is does one build some of these ways into the base system and reject the others? If an application developer discovers a more efficient way of managing replicated objects within his application then it would be desirable for him to be able to use his new mechanism without having to change the base mechanism. Moreover, while the base system could be used to support some standard base mechanisms for particular properties such as replication, persistence, crash recovery, and caching, this seems to pose two dangers. First, it may make simple object invocation expensive, even for those objects that do not desire the expensive properties. Secondly, it makes it difficult for third parties to add new properties that are peculiar to their particular needs.

Accordingly, what is needed is a method to provide control of the basic mechanisms of object invocation and argument passing that are most important in distributed systems, wherein the method is implemented by some scheme which is separated from object interfaces and object implementations.

Techniques for providing a language-level veneer for remote operations (for example, "Remote Procedure Calls") have been in use for many years. Typically these take the form that a remote interface is defined in some language. Then a pair of stubs are generated from this interface. The client stub runs in one machine and presents a language level interface that is derived from the remote interface. The server stub runs in some other machine and invokes a language-level interface that is derived from the remote interface. Referring now to FIG. 1, to perform a remote operation, a client application 12 on one machine 10, invokes the client stub 14, which marshals the arguments associated with the invocation into network buffer(s) and transmits them to the server stub 22 on the remote machine 18, which unmarshals the arguments from the network buffer(s) and calls the server application 24. Similarly, when the server application 24 returns a response, the results are marshaled up by the server stub 22 and returned to the client stub 14, which unmarshals the results and returns them to the client application 12. The entire mechanics of argument and result transmission, and of remote object invocation, are performed in the stubs. Both the client application and the server application merely deal in terms of conventional language-level interfaces.

When the arguments or results are simple values such as integers or strings, the business of marshaling and unmarshaling is reasonably straightforward. The stubs will normally simply put the literal value of the argument into the network buffer. However, in languages that support either abstract data types or objects, marshalling becomes significantly more complex. One solution is for stubs to marshall the internal data structures of the object and then to unmarshal this data back into a new object. This has several serious deficiencies. First, it is a violation of the "abstraction" principle of object-oriented programming, since stubs have no business knowing about the internals of objects. Second, it requires that the server and the client implementations of the object use the same internal layout for their data structures. Third, it may involve marshalling large amounts of unnecessary data since not all of the internal state of the object may really need to be transmitted to the other machine. An alternative solution is that when an object is marshalled, none of its internal state is transmitted. Instead an identifying token is generated for the object and this token is transmitted. For example in the Eden system, objects are assigned names and when an object is marshalled then its name rather than its actual representation is marshalled. Subsequently when remote machines wish to operate on this object, they must use the name to locate the original site of the object and transmit their invocations to that site. This mechanism is appropriate for heavyweight objects, such as files or databases, but it is often inappropriate for lightweight abstractions, such as an object representing a Cartesian coordinate pair, where it would have been better to marshal the real state of the object. Finally, some object-oriented programming systems provide the means for an object implementation to control how its arguments are marshalled and unmarshalled. For example, in the Argus system object implementors can provide functions to map between their internal representation and a specific, concrete, external representation. The Argus stubs will invoke the appropriate mapping functions when marshalling and unmarshaling objects so that it is the external representation rather than any particular internal representation that is transmitted. These different solutions all either impose a single standard marshalling policy for all objects, or require that individual object implementors take responsibility for the details of marshalling.

Within object-oriented languages, the technique of reflection permits object implementors to gain control of some of the fundamental object mechanisms. [See "Reflective Facilities in Smalltalk-80," by Brian Foote & Ralph E. Johnson 1989, OOPSLA '89 Proceedings, pages 327–335]. Very simply, a reflective system is one which incorporates structures representing aspects of itself, and reflective computation is a system's computations about itself.

For example in the 3-KRS language, objects can have meta-objects associated with them. A meta-object provides methods specifying how an object inherits information, how an object is printed, how objects are created, how message passing (that is, object invocation) is implemented, etc. 3-KRS does not however provide any control over argument passing.

By providing reflective object invocation in Smalltalk-80 it was possible to implement objects which are automatically locked during invocation and objects which only compute a value when they are first read.

However while reflection has been used within a single address space, there has been no attempt to apply it specifically to the problems of distributed computing.

Accordingly, the present invention provides an apparatus and a method comprising a logic module, called a sub-contract, that has been designed to provide control of the basic mechanisms of object invocation and argument passing that are most important in distributed systems, in a way which makes it easy for object implementors to select and use an existing sub-contract, and which permits the application programmers to be unaware of the specific sub-contracts that are being used for particular objects.

SUMMARY OF THE INVENTION

The present invention provides an elegant and simple way to provide mechanisms for invocation of objects by client applications and for argument passing between client applications and object implementations, without the client application or the operating system knowing the details of how these mechanisms work. Moreover, these mechanisms functions in a distributed computer environment with similar ease and efficiency, where client applications may be on one computer node and object implementations on another.

The invention includes a new type of object, termed a "spring object," which includes a method table, a subcontract mechanism and a data structure which represents the subcontract's local private state.

The subcontract mechanism is the heart of the present invention, and each subcontract contains a client-side portion and a related server-side portion. Each object type has an associated subcontract. The client-side portion of a subcontract has the ability to generate a new spring object, to delete a spring object, to marshal information about its associated object into a communications buffer, to unmarshal data in a communications buffer which represents its associated object, to transmit a communications buffer to its associated server-side subcontract, which includes either transmitting an object from one location to another or transmitting a copy of an object from one location to another. The server-side portion of the subcontract mechanism includes the ability to create a spring object, to provide support for processing incoming calls and related communications buffers and to provide support for revoking an object.

The invention includes methods for using subcontracts to process object invocations, including the passing of arguments, which arguments may themselves be objects, in a distributed computing system, wherein the client applications may be on different computers from the object implementations.

Similarly, the claimed invention includes a computer program product embodying these subcontract mechanisms.

DESCRIPTION OF THE DRAWINGS

The objects, features and advantages of the system of the present invention will be apparent from the following description in which:

FIGS. 10a & 10b illustrate the SPRING view of objects versus the prior art view of objects.

NOTATIONS AND NOMENCLATURE

Figure 1:
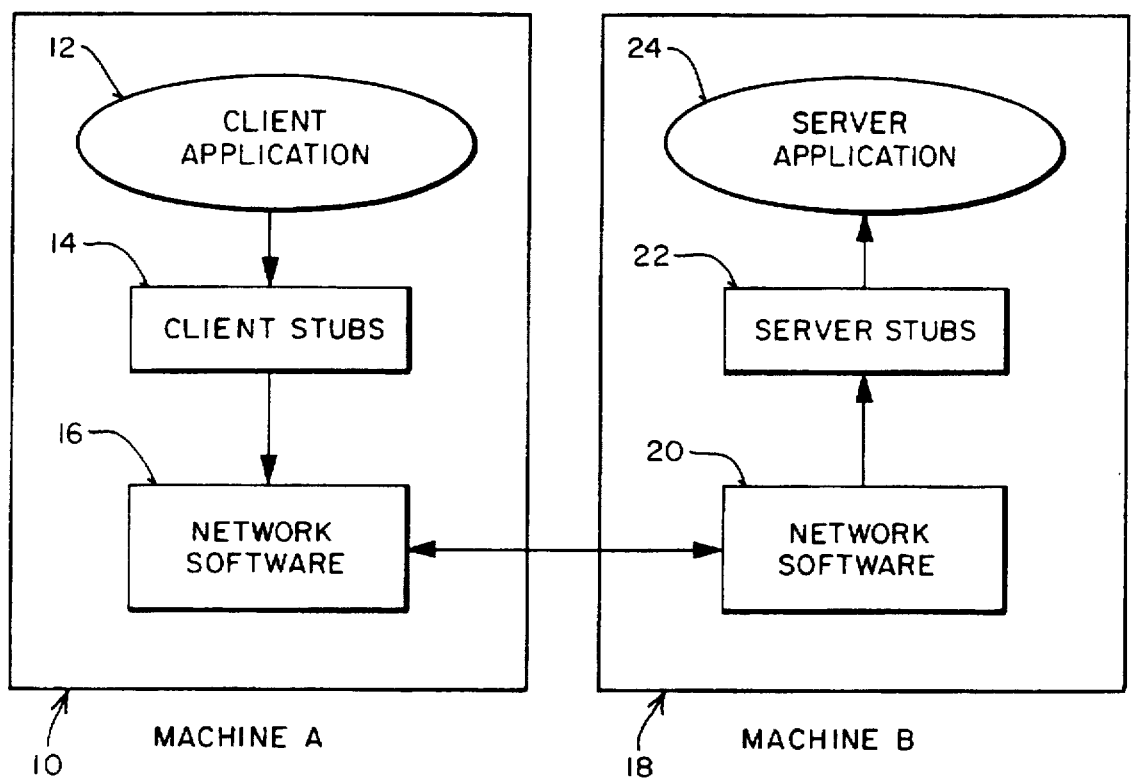
FIG. 1 illustrates the prior art relationship of client and server applications to stubs and network software.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

The following disclosure describes solutions to the problems which are encountered by object oriented systems designers when attempting to implement schemes for object invocation and for argument passing in distributed systems wherein the arguments may be objects, in ways which do not lock the object oriented base system into methods which may be difficult to change at a later time. The invention includes a new type of object, termed a "spring object," which includes a method table, a subcontract mechanism and a data structure which represents the subcontract's local private state. A method and an apparatus are disclosed for a subcontract mechanism which is associated with each object. Each subcontract contains a client-side portion and a related server-side portion. Each object type has an associated subcontract. The client-side portion of a subcontract has the ability to generate a new spring object, to delete a spring object, to marshal information about its associated object into a communications buffer, to unmarshal data in a communications buffer which represents its associated object, to transmit a communications buffer to its associated server-side subcontract, which includes either transmitting an object from one location to another or transmitting a copy of an object from one location to another. The server-side portion of the subcontract mechanism includes the ability to create a spring object, to provide support for processing incoming calls and related communications buffers and to provide support for revoking an object.

In the following description, for purposes of explanation, specific data and configurations are set forth in order to provide a thorough understanding of the present invention. The preferred embodiment described herein is implemented as a portion of the SPRING Object-Oriented Operating System created by Sun Microsystems®, Inc. (Sun Microsystems is a registered trademark of Sun Microsystems, Inc.) However, it will be apparent to one skilled in the art that the present invention may be practiced without the specific details and may be implemented in various computer systems and in various configurations, or makes or models of tightly-coupled processors or in various configurations of loosely-coupled multiprocessor systems.

A SPRING object is an abstraction that contains state and provides a set of methods to manipulate that state. The description of the object and its methods is an interface that is specified in the interface definition language. The interface is a strongly-typed contract between the implementor (server) and the client of the object.

A SPRING domain is an address space with a collection of threads. A given domain may act as the server of some objects and the clients of other objects. The implementor and the client can be in the same domain or in a different domain.

Since SPRING is object-oriented it supports the notion of interface inheritance. Spring supports both notions of single and multiple interface inheritance. An interface that accepts an object of type "foo" will also accept an instance of a subclass of "foo". For example, the address_space object has a method that takes a memory_object and maps it in the address space. The same method will also accept file and frame_buffer objects as long as they inherit from the memory_object interface.

The SPRING kernel supports basic cross domain invocations and threads, low-level machine-dependent handling, as well as basic virtual memory support for memory mapping and physical memory management A SPRING kernel does not know about other SPRING kernels—all remote invocations are handled by a network proxy server. In addition, the virtual memory system depends on external pagers to handle storage and network coherency.

Figure 2:
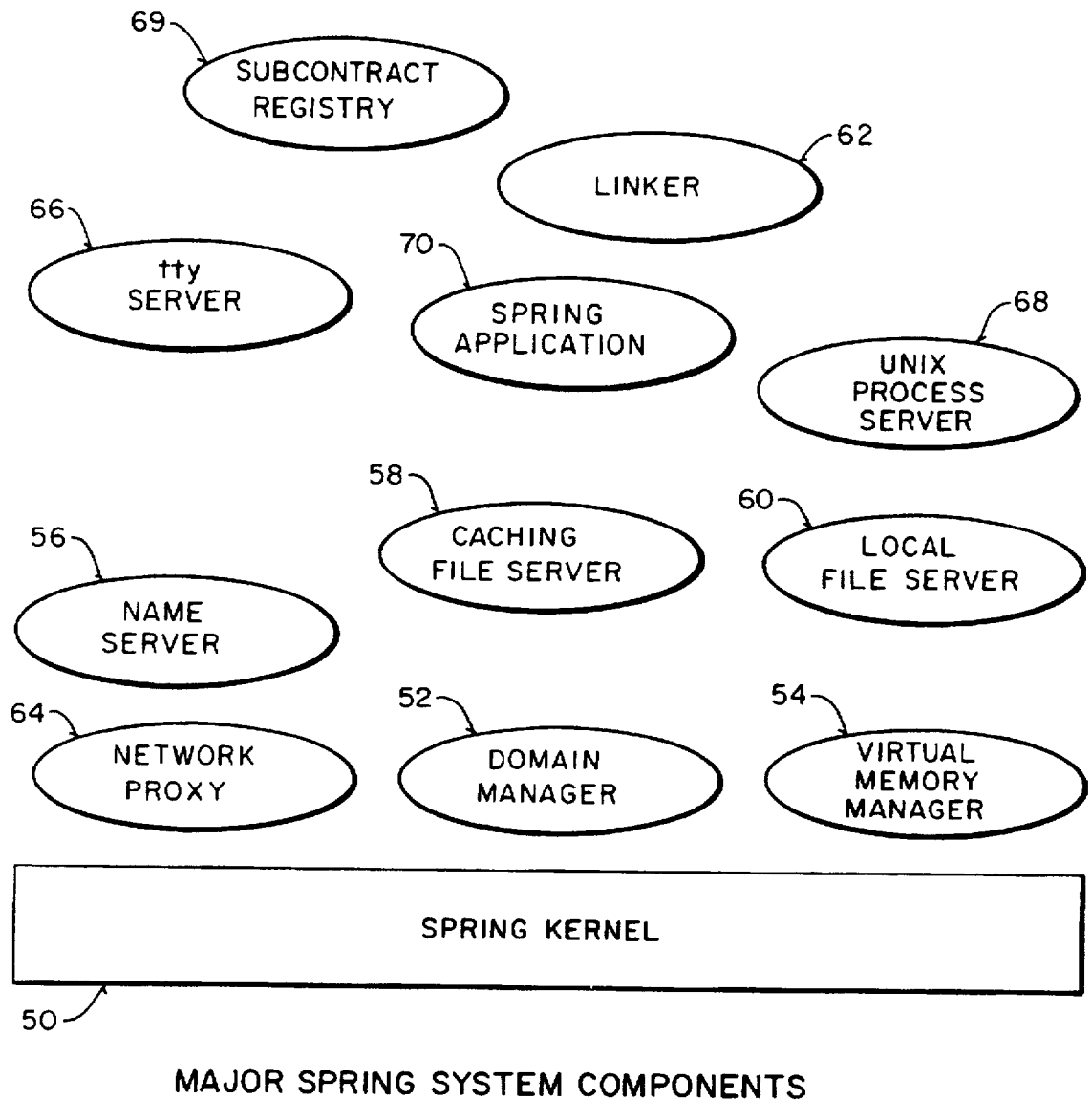
FIG. 2 illustrates the major system components of the SPRING operating system.

Referring to FIG. 2, a typical SPRING node runs several servers in addition to the kernel 50. These include the domain manager 52; the virtual memory manager ("VMM") 54; a name server 56; the CFS file server 58; a local file server 60; a linker domain 62 that is responsible for managing and caching dynamically linked libraries; a network proxy 64 that handles remote invocations; and a tty server 66 that provides basic terminal handling as well as frame-buffer and mouse support. Other major SPRING system components which might be present are a UNIX process server 68, a subcontract registry 69 and any number of SPRING applications 70.

SPRING is an experimental distributed environment. It currently includes a distributed operating system and a support framework for distributed applications. SPRING is intended to explore solutions to a number of the problems of existing operating systems, particularly the problems of evolving and extending the system over time.

SPRING is focused on providing interfaces rather than simply on providing implementations. SPRING encourages the coexistence of radically different implementations of a given interface within a single system. It has proven convenient to use the object metaphor to express this separation of interfaces and implementations.

SPRING aims to make it easy for application writers to add new fundamental properties to the system, without having to change the base mechanisms. For example, the current system has no support for atomic transactions. It should be possible to slowly add new properties like these to the system.

The Interface Definition Language

The unifying principle of SPRING is that all the key interfaces are defined in a standard interface definition language. This language is object-oriented and includes support for multiple inheritance. It is purely concerned with interface properties and does not provide any implementation information.

From the interface definition language it is possible to generate language-specific stubs. These stubs provide a language-specific mapping to the SPRING interfaces. For example, in our main implementation language, C++, Spring objects are represented by C++ objects. When a method on a stub object is invoked, it will either perform a local call within the current address space or forward the call to another address space, which may be on a different machine.

SPRING places an unusually strong emphasis on the separation of interfaces from implementations. Clients are constrained to operate on what they perceive as local objects and the system imposes no constraints on how these objects are implemented. For example, sometimes the underlying state of an object might be in the same address space as the client, sometimes it might be in another address space, sometimes it might be in memory that is shared between the client and the server, or sometimes it might dynamically migrate between several of these states.

The Spring Object Model

SPRING has a slightly different way of viewing objects from other distributed object oriented systems and it is necessary to clarify this before discussing the details of subcontract.

Most distributed systems present a model that objects reside at server machines and client machines possess object handles that point to the object at the server. (See FIG. 10a.) So clients pass around object handles rather than objects.

SPRING presents a model that clients are operating directly on objects, not on object handles. (See FIG. 10b.) Some of these objects happen to keep all their interesting state at some remote site, so that their local state merely consists of a handle to this remote state. An object can only exist in one place at a time, so if we transmit an object to someone else then we cease to have the object ourselves. However, we can also copy the object before transmitting it, which might be implemented such that there are now two distinct objects pointing to the same remote state.

So whereas in systems such as Eden, one might talk of several clients having object handles that reference some remote object, in SPRING one would talk about several clients having objects that reference the same remote state.

For most server-based objects this distinction is mainly one of terminology. However SPRING also supports objects which are not server based, or where the state of the object is split between the client and the server. In these cases it is much more convenient to regard the client as possessing the true object, rather than merely possessing a pointer.

At the present time, the SPRING operating system is based around a minimal kernel, which provides basic object-oriented interprocess communication and memory management. Functionality such as naming, paging, file systems, etc. are all provided as user-mode services on top of the basic kernel. The system is inherently distributed and a number of caching techniques are used to boost network performance for key functions. The system also supports enough UNIX emulation to support standard utilities such as make, vi, csh, the X window system, etc.

SPRING's goal is to support a great deal of diversity. It is regarded as important that individual subsystems can develop their own ways of doing business, which can bypass the general rules and conventions.

The Subcontract Mechanism

In more modern systems, the application software does not talk directly to the network software. Instead the application software talks to "stubs" (14 in FIG. 1). There is a distinct stub for each distinct interface that is supported over the network. The stub code is responsible for converting between a specific language-level interface seen by application level software and the standard low-level communication interfaces provided by the network software. For example, the stubs are responsible for taking the arguments to a remote call and putting them into a message suitable for the network software to transmit over the network.

Figure 4:
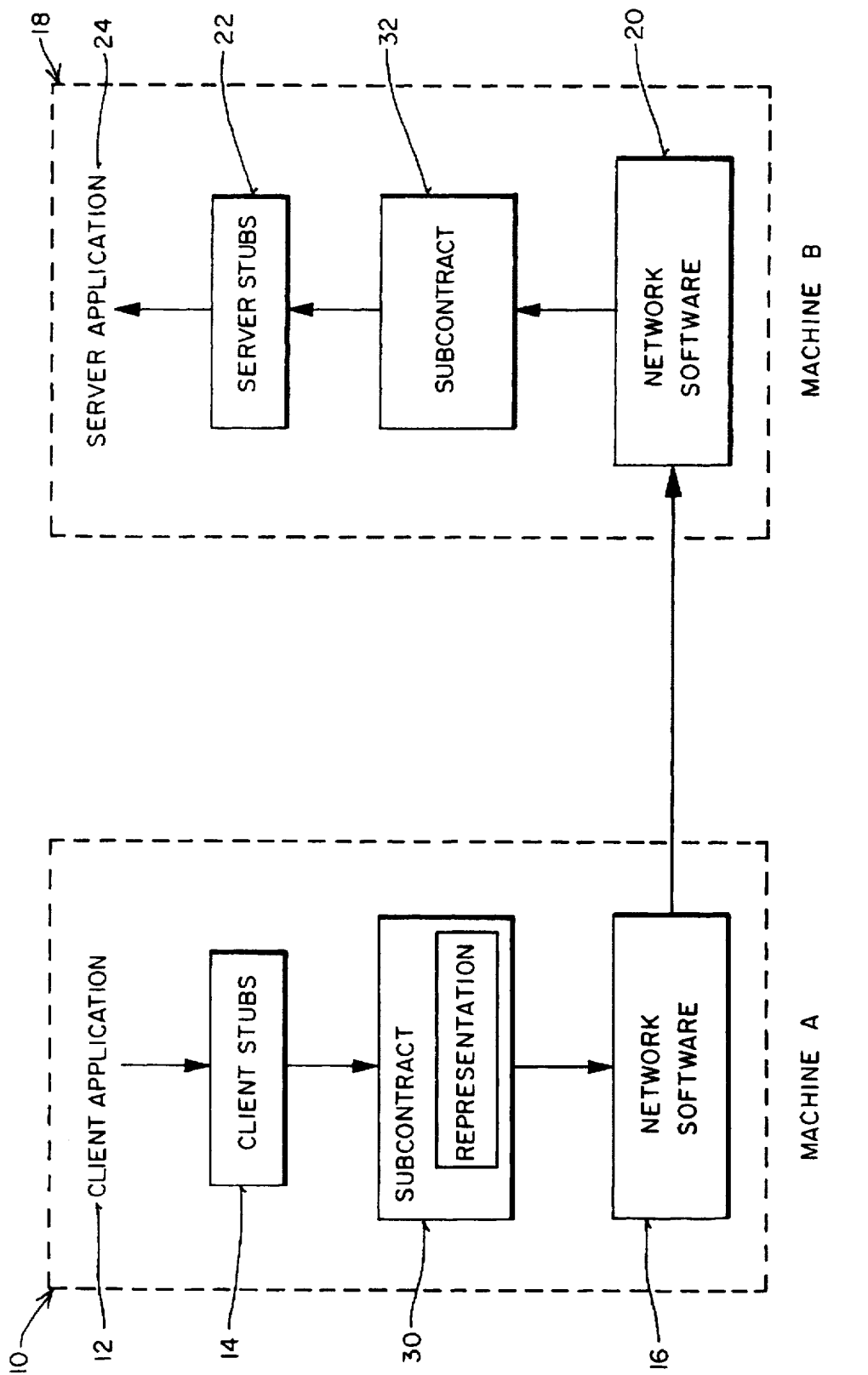
FIG. 4 illustrates remote object invocation using subcontract.

Referring now to FIG. 4, in the environment of the present invention, the client application 12 on a machine 10, issues calls to the appropriate client-side stub 14, who calls upon a client-side portion of a "Subcontract" 30, which subcontract talks to the network software 16 which communicates with its counterpart network software 20, generally on another machine 18. This server-side network software 20 transfers incoming messages to the server-side portion of subcontract 32 who in turn delivers the data to the server application 24. As indicated, Subcontract fits between the stubs and the network software. The stubs use a subcontract to perform remote calls and similarly the subcontract then uses the network software to perform the actual call. Different subcontracts will implement different kinds of remote communication protocols (for replication, for caching, etc) on top of the standard communications software.

Figure 5:
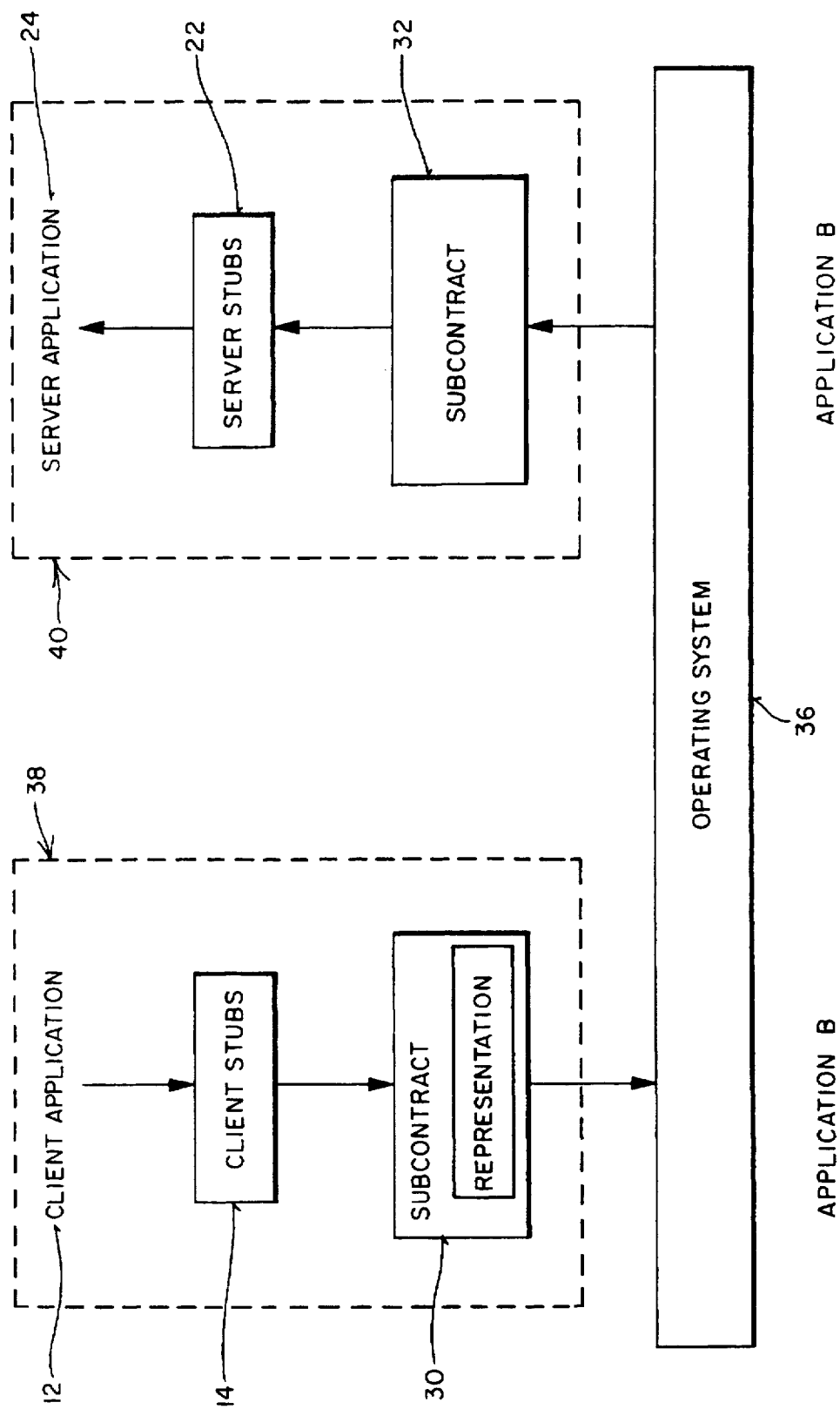
FIG. 5 illustrates object invocation on a single machine using subcontract.

Within a single computer, different applications may also use subcontract to communicate. Referring now to FIG. 5, the client application 12 is in an application space 38 and issues calls on the appropriate client-side stub 14, who in turn calls the appropriate subcontract 30. The subcontract 30 transfers its communications to the operating system 36, which relays them to the server-side subcontract 32, who in turn gives the data to its server-side stub 22 who passes the data to the server application 24. In this case inter-process communication primitives provided by the operating system 36 replace the inter-machine communication mechanisms provided by the networking software (16 & 20 in FIG. 4).

Even within a single application running in a single address space, subcontract may be used to communicate between different components of the application.

Figure 3:
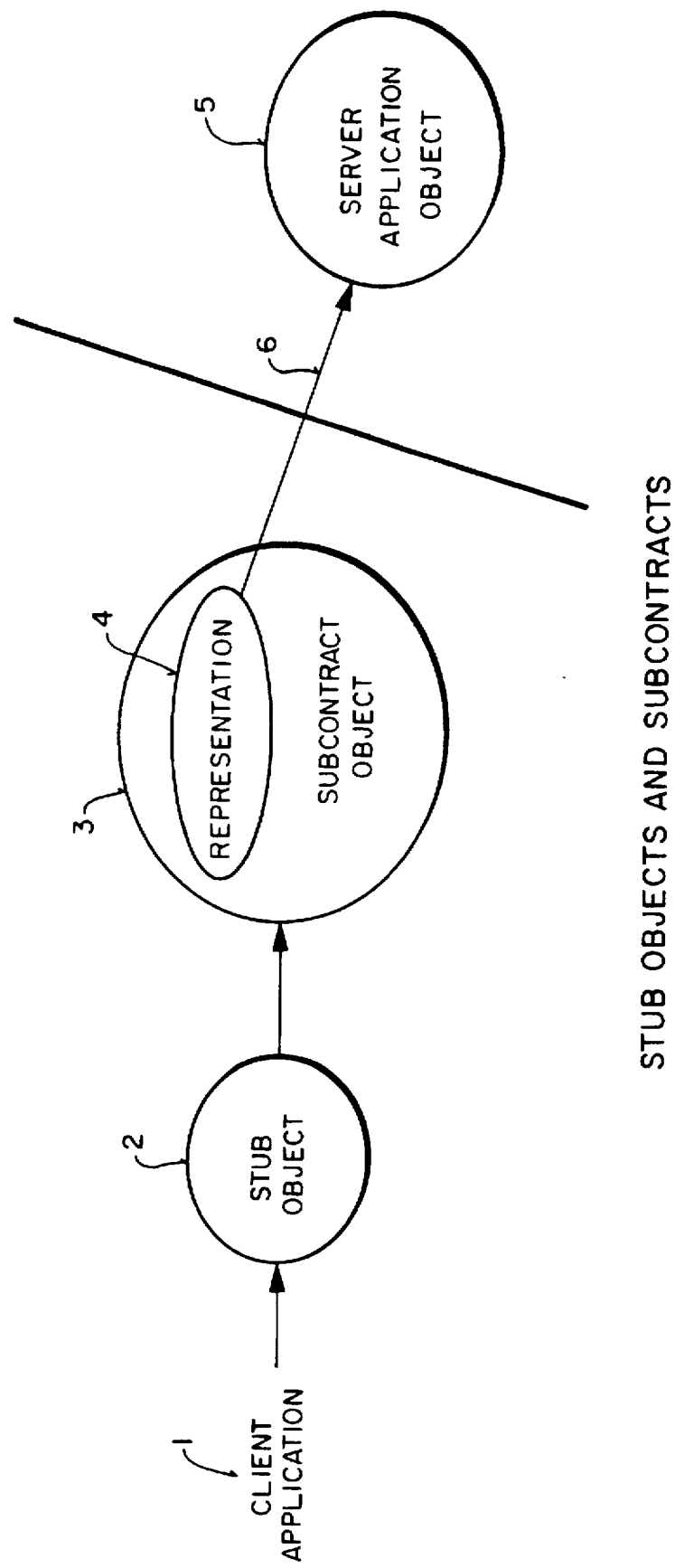
FIG. 3 illustrates the relationship between stub objects, subcontract objects and server application objects.

Now, referring to FIG. 3, looking at things from an object-oriented perspective, the client application 1 operates in terms of "stub objects" 2. Each of these stub objects 2 contains a subcontract object 3 whose internal state 4

(known as its "representation") may contain some form of pointer 6 to the real underlying state 5, which may reside in the same address space, in another address space on the same machine, or on another machine entirely. The underlying state will typically be itself represented as an object 5 in the server application's address space.

Where Sub Contract Fits In

A Spring object is perceived by a client as consisting of three things: a method table, which contains an entry for each operation implied by the object's type definition; a subcontract description which specifies the basic subcontract operations described in the next section; and some local private state, which is referred to as the object's representation.

A client interacts with an object by invoking methods on what appears to be a C++ object. The code for this object has in fact been automatically generated and it transforms the method in vocations into calls on either the object's regular method table or on its subcontract operations vector. How these methods achieve their effect is hidden from the client.

If the object is implemented by a remote server, then a typical arrangement will be that the subcontract implements the machinery for communicating with the remote server, while the method table consists of pointer to stub methods whose sole duty is to marshal the arguments into a buffer, call the subcontract to execute the remote call and then unmarshal any results from the reply buffer. SPRING provides an automatic stub generator to generate appropriate stubs from the interface definition language.

In the remote server there will typically be some subcontract code to perform any subcontract work associated with incoming calls and some server side stub code that unmarshals the arguments for each operation and calls into the server application. (This server stub code is also automatically generated.)

If an object is implemented entirely locally, then it is possible to avoid using stub methods and to provide implementation methods that can be placed directly into the method table. SPRING provides support for generating method tables in this case.

Basic Subcontract Mechanisms

The client side subcontract operations are:
copy
consume
unmarshal
marshal
marshal_copy
invoke
invoke_preamble
narrow
object_type_id
object_manager_id
is_null To illustrate the subcontract operations, we shall use as an example a subcontract called singleton. This subcontract is built on a SPRING kernel communication facility called doors. A door is a communication endpoint, to which threads may execute cross address space calls. A domain that creates a door receives a door identifier, which it can pass to other domains so that they can issue calls to the associated door. The kernel manages all operations on doors and door identifiers, including their construction, destruction, copying and transmission.

In singleton, a server domain maintains the underlying state associated with an object and creates a door to accept incoming calls. The client domains merely possess a door identifier that they use to call through to the server domain.

Thus a SPRING object built on the singleton subcontract consists of a method table that consists entirely of stub methods, a singleton subcontract descriptor and a representation that consists of a kernel door identifier.

Copy

The subcontract copy operation is used to generate a new spring object which is closely related to an existing spring object. The exact relationship of the copy to the original is entirely dependent on the behavior of the subcontract. Sometimes the subcontract code can perform the copy itself, but sometimes it may chose to involve the object's implementation code.

Singleton implements copy by asking the kernel to make a copy of the current door identifier and then creating a new object whose representation is this new door identifier and which reference the same subcontract and method table as the current object. So after the copy there are now two distinct spring objects that each reference the same underlying server state. (In this case the semantics of copy are the semantics of copying a pointer.)

For a serverless object, the implementation of copy might involve copying the entire state of the object so that the new object is entirely distinct from the original object.

Consume

The subcontract consume operation is used to delete a spring object.

Singleton implements consume by deleting the door identifier associated with the current object. This does not directly affect the server state of the object and if there are any other spring object that reference the same server state, then they will be unaffected by this operation.

It should be noted that in practice, when all the door identifiers that reference a door have been deleted, the kernel notifies the server so that it may release its server state, if it chooses.

Marshal

The subcontract marshal operation is used when transmitting an object to another machine.

It takes the current object and places enough information in a communications buffer so that an essentially identical object can be unmarshalled from this buffer in another domain.

Since the desired semantics are to transmit the object, it is clear that after we have sent the object we should no longer have it in our address space. Thus an implicit side-effect of marshal is to delete all the local state associated with the object.

Singleton implements marshal by placing its door identifier in the marshal buffer. The kernel's cross-domain call mechanism will implicitly delete the door identifier from this domain when it transmits the communications buffer to another domain.

Marshal copy

Our interface definition language supports a parameter passing mode of copy. This mode implies that a copy of the argument object is transmitted. but the current domain retains the original object.

This mode was originally implemented by first calling the subcontract copy operation and then by calling the subcontract marshal operation. However, it was observed that this frequently led to redundant work in fabricating a Spring object that was immediately deleted. This was particularly expensive for serverless objects with large amounts of state.

Thus the marshal-copy operation was introduced. It is defined to produce the effect of a copy followed by a marshal, but it is permitted to optimize out some of the intermediate steps.

In the case of singleton, we simply copy the current door identifier and put the new door identifier into the communications buffer.

In the case of a serverless object, marshal-copy might involve copying its data structures into the marshal buffer.

Unmarshal

The unmarshal operation is used when receiving an object from another domain. It's job is to fabricate a full-fledged spring object, consisting of a method table, subcontract vector and representation.

When some software (typically a stub method) decides to read an object from a communications buffer, it must chose both an initial subcontract and an initial method table based on the expected type of the object. It then invokes the initial subcontract, passing it the initial method table.

The subcontract must then attempt to fabricate an object based on the information in the communications buffer. This typically involves reading enough information from the communications buffer in order to be able to create a representation.

In the case of singleton, this normally involves reading a door identifier out of the buffer and creating a representation to hold this door identifier.

Finally, unmarshal plugs together the subcontract pointer, the method table pointer and the representation to create a new spring object.

Invoke

The invoke operation is used to transmit an argument buffer to a destination and receive a result buffer.

In the case of singleton, this simply involves a trap to the kernel to perform the cross-domain call to the target door identifier.

In the case of a subcontract supporting replication, this might involve transmitting the argument buffer to one (or more) of a set of possible servers.

Invoke_Preamble

The subcontract invoke operation is only invoked after all the argument marshaling has already occurred. In practice it was noted that there are cases where an object's subcontract would like to become involved earlier in the process, so that it can either write some preamble information into the communications buffer or set flags to influence future marshalling.

To enable the subcontract to set up any needed state, SPRING has a new subcontract operation invoke_preamble, which is invoked before any argument marshaling has occurred.

For example, in some situations a subcontract might use a shared memory region to communicate with a server. In this case when invoke_preamble is called the subcontract can adjust the communications buffer to point into the shared memory region so that arguments are directly marshalled into the region, rather than having to be copied there after all marshalling is complete.

Object_type_id

Spring supports a limited amount of runtime typing. This is used during operations such as object browsing or to validate the type-safety of certain operations (notably naming) which cannot rely on static type checking.

The object_type_id operation returns the true type_id for the current object.

Some subcontracts implement this operation by calling through to the server to obtain the type_id. Other subcontracts implement this operation by keeping the object's type_id as part of its representation, which requires that it be transmitted as part of the marshalled form of the object.

Narrow

The subcontract narrow operation is used to support a type-checked type narrowing on an object from a base type to a derived type. The operation uses the object's type_id to validate that the narrow is valid and raises an exception if it is not.

Object_manager_id

This subcontract operation supports the Spring naming architecture. It provides a reliable way to obtain a name for an object's underlying server. It is typically implemented by calling through to the underlying server to obtain the name.

Is_null

Spring supports a notion of null objects. These provide placeholder objects that can be used during program and data structure initialization. By convention, null objects raise exceptions on all methods and on most subcontract operations.

SPRING supports null objects by providing them with special null subcontracts. The is_null operation of a null subcontract returns true, where normal subcontracts return false.

Null subcontracts typically allow their objects to be marshalled, but raise exceptions on most other subcontract operations.

An Example of Subcontract Use

It is useful to consider the sequence of subcontract operations performed when invoking a remote object. Note that this is only an example, and those skilled in the art will realize that subcontracts as defined in the present invention can be made to do much more exotic things than are described here. Please refer in the following discussion to FIGS. 6 through 9.

Assume that we have an object A which supports a method Fred and which uses a subcontract SA.

fred: proc (copy x: wombat) returns fruitbat

The return type fruitbat is known to use some subcontract SF.

Say we have an object X of type wombat which uses a subcontract SX, and we call A's fred method passing in X as an argument 50:

1. First we enter the stub method for "fred" 52.54.
2. The stub code calls A's invoke_preamble operation 56.

Figure 6:
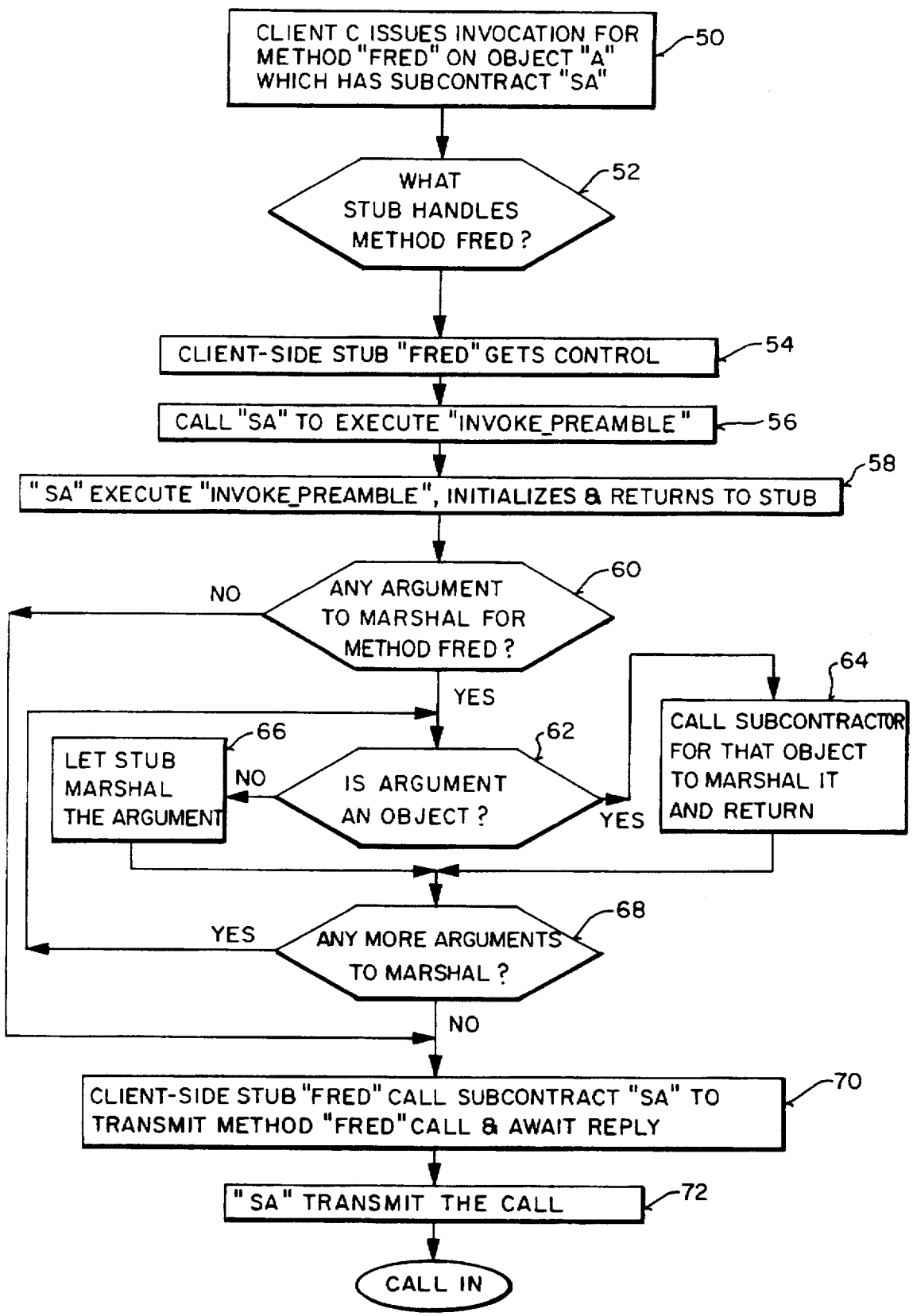
FIGS. 6–9 illustrate a flow chart of an exemplary use of the inventive method of subcontract.
Figure 7:
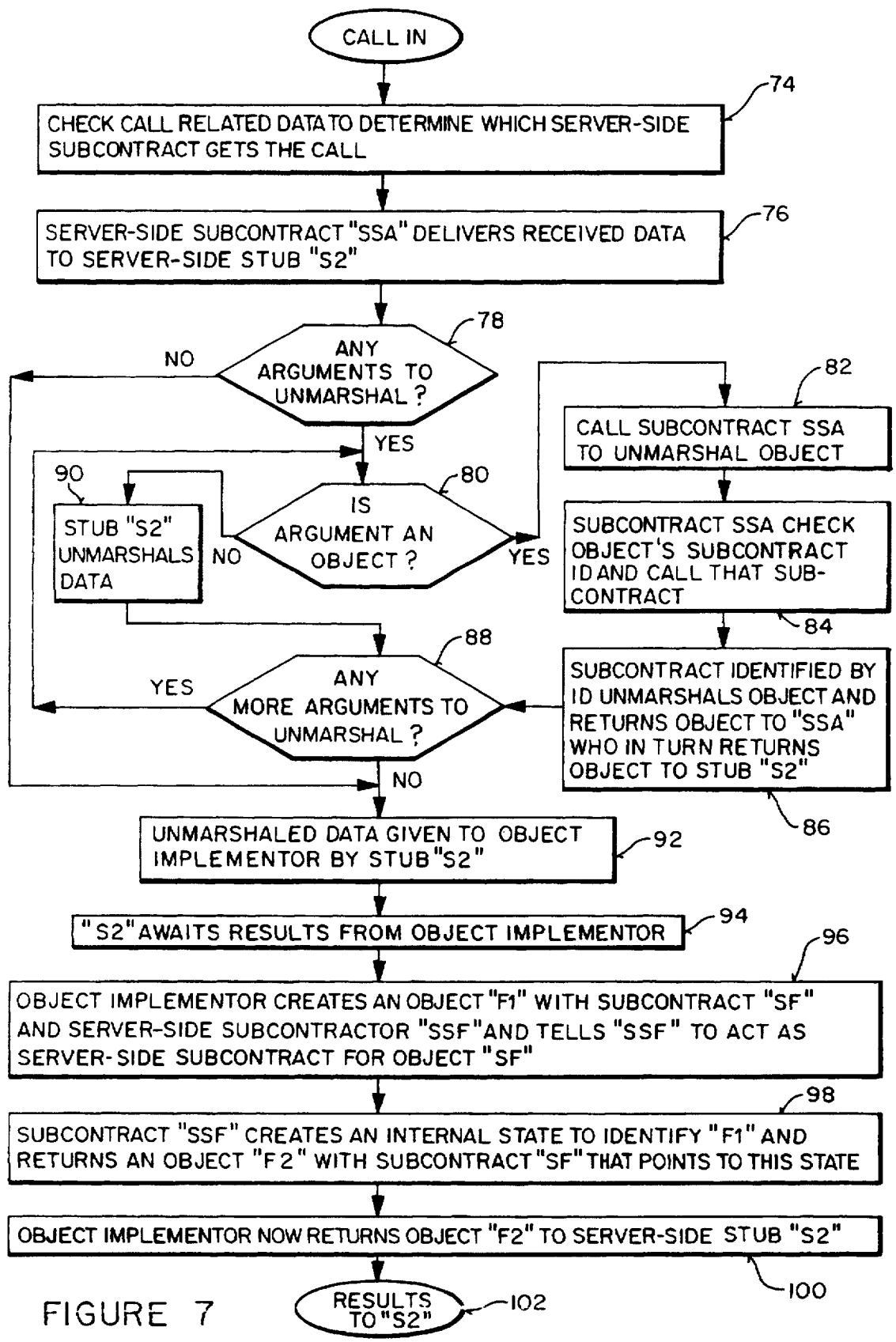
Figure 8:
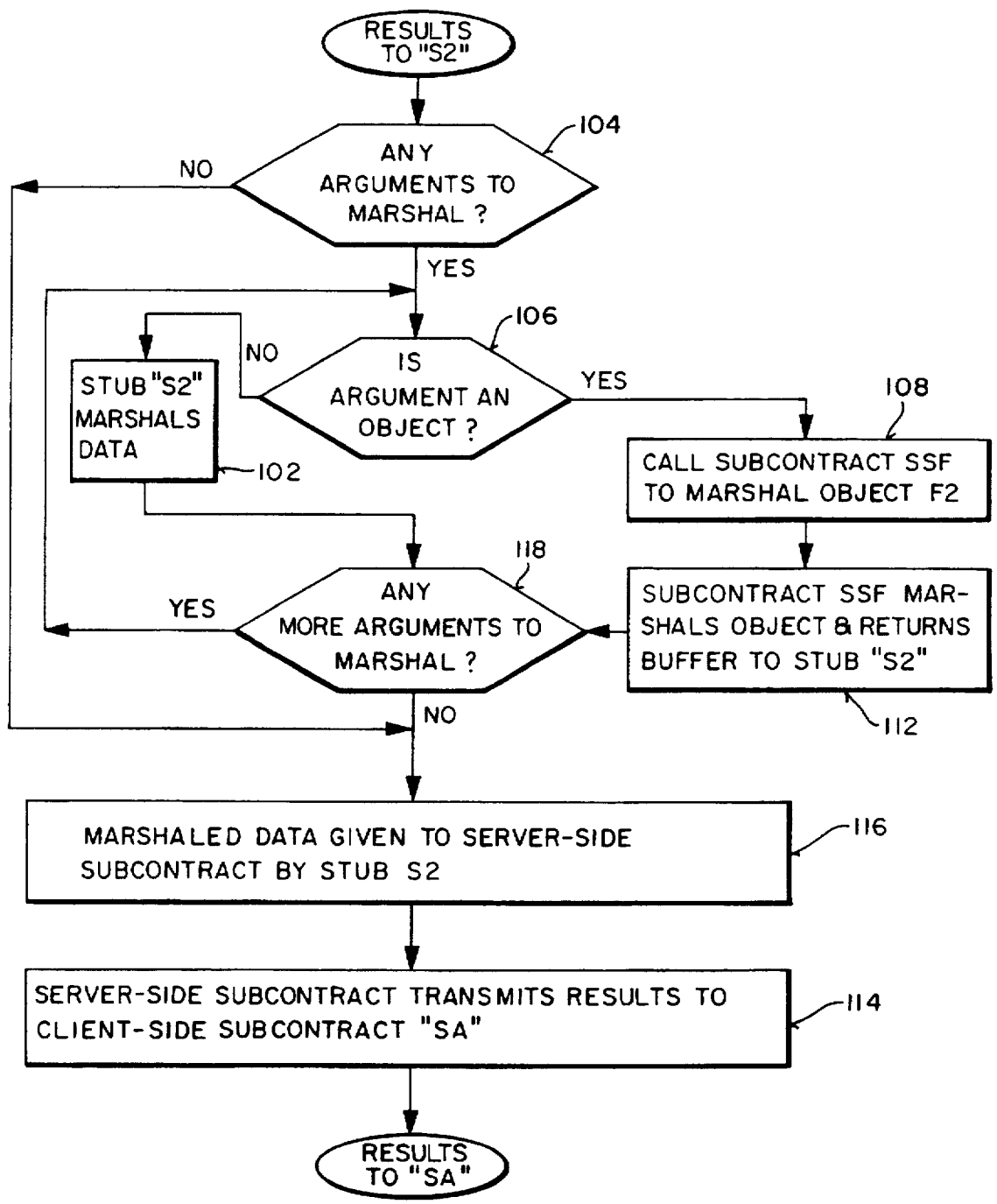
Figure 9:
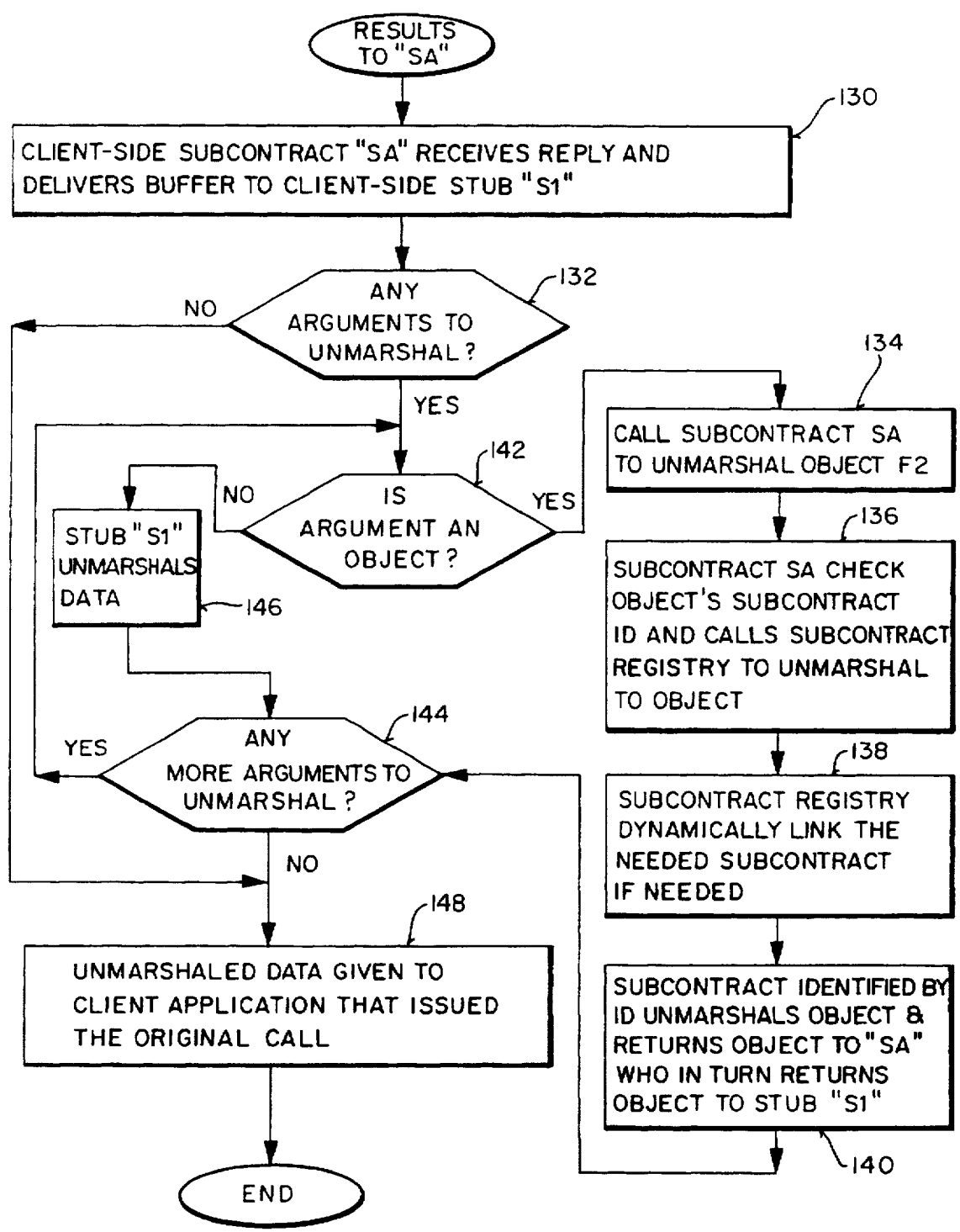

3. The SA invoke_preamble code performs any necessary initialization and returns 58.
4. The stub code then attempts to marshal the argument object X as a copy argument, by invoking X's marshal_copy operation. In FIG. 6 this proceeds as follows: stub fred makes a test to see if there are any arguments to be marshaled 60. Since the answer is yes, then stub fred tests the arguments to see if any are objects 62. Finding object X and knowing that X has a subcontract SX, stub fred calls subcontract SX to marshal object X 64.
5. The SX marshal_copy code arranges for information describing a copy of X to be put in the argument buffer and returns to stub fred 64.
6. The stub code has now marshalled all the arguments and is now ready to actually execute the call. So it calls A's invoke operation 70.
7. The SA invoke method performs the work necessary to transmit the argument buffer to the target server, with a request that an invocation on the Fred method occurs on the server state for the object A, and then awaits a result buffer back from the server 72.
8. Referring now to FIG. 7, the call is received by the target server and the data delivered to server-side subcontract SSA who delivers the buffer to server-side stub S2 74,76. Stub S2 checks to see if there are arguments to unmarshal 78 and then to see if any of the arguments are objects 80. Finding that there is an object X to be unmarshaled, stub S2 invokes the unmarshal operation of the SSA subcontract 82. Subcontract SSA checks object X's subcontract id to find that it has subcontract SX associated with it 84. Subcontract SSA then invokes the unmarshal operation on subcontract SX 84, and subcontract SX unmarshals object X returning it to subcontract SSA who in turn returns it to stub S2 86. Stub S2 having completed the unmarshaling of all arguments received passes the call and arguments to the targeted object implementation 92, and awaits a reply 94. The object implementor processes the call and creates an object fruitbat-1 with subcontract SF and a server-side subcontract SSF and instructs subcontract SSF to act as server-side subcontract for subcontract SF 96. Subcontract SSF creates an internal state to identify fruitbat-1 and returns object fruitbat that points to this state 98. Object implementor now returns object fruitbat to server-side stub S2 for return to the client 100. Referring now to FIG. 8. Stub S2 now must go through the marshaling of arguments routine again to marshal object fruitbat 104,106,108, 110, and 112, returning the marshaled arguments to stub S2 who delivers the marshaled data to the server-side subcontract SSA for retransmission to client-side subcontract SA 116, 114.
9. The stub code now receives the result buffer from the SA invoke method 130 and wishes to start unmarshalling the results. In this case the result is known to be an object of type fruitbat, which has subcontract SF, so stub fred (SA) invokes the unmarshal operation of the SF subcontract, passing in the regular method table for the type fruitbat. The entire invocation steps are shown in blocks 142,134,136,138 and more fully described in the discussion on compatible objects below.
10. The SF unmarshal code now attempts to unmarshal an object from the result buffer. It combines the information from the result buffer with its own subcontract method table and with the regular method table it was passed to form a new Spring object, which it passes back to the stub 140.

10. The fred stub has now completed its task and can return the result object to application level 148.

The process has been driven by the stub code for A's fred method, but has also involved the subcontracts for the target object, for the argument object and for the result object.

Compatible Subcontracts

Clearly it is desirable for different objects to have different subcontracts. In particular, two objects which are perceived by the client application as having the same type, may in fact have different subcontracts. For example, one instance of the "file" type may use the standard "singleton" subcontract, while another instance of "file" may use the more interesting "cachable" subcontract.

For each type a standard subcontract can be specified for use when talking to that type, but what does SPRING do when a different subcontract is actually needed?

For example, the standard type file is specified to use a simple subcontract called singleton. The type cachable_file is a subtype of file, but instead uses the caching subcontract. So what happens when an object of type cachable_file is sent where an object of type file is expected? Clearly if the receiver insists on unmarshalling the caching object as though it were a singleton, then it is going to be disappointed.

This problem is solved by introducing the notion of compatible sub contracts. A subcontract A is said to be compatible with a subcontract B if the unmarshalling code for subcontract B can correctly cope with receiving an object of subcontract A.

The normal mechanism used to implement compatible subcontracts is to include some form of subcontract identifier as part of the marshaled form of each object.

So a typical subcontract unmarshal operation starts by taking a peek at the expected subcontract identifier in the communications buffer. If it contains the expected identifier for the current subcontract, then the subcontract goes ahead with a regular unmarshal. However if it sees some other value then it calls into a registry to locate the correct code for that subcontract and then calls that subcontract to perform the unmarshalling.

Currently all our subcontracts are compatible with each other and they use a single scheme for identifying themselves. However, it would be possible to add other sets of subcontracts which used different schemes for mutual identification and which were incompatible with the standard set.

Discovering New Subcontracts

A program will typically be linked with a set of libraries that provide a set of standard subcontracts. However at runtime it may encounter objects which use subcontracts that are not in its standard libraries.

A mechanism is provided to map from subcontract identifiers to library names and dynamic linking of libraries to obtain new subcontracts is supported.

Say that a domain is expecting to receive an object of type file, using the singleton subcontract, but we instead send it an object of type replicated_file using the replicon subcontract. The singleton unmarshal operation will discover that it is dealing with a different subcontract and it will call into the domain's subcontract registry to find the correct subcontract code. The registry will discover that there is currently no suitable subcontract loaded, but it will then use a network service to map the subcontract identifier into a library name (say replicon.so) and it will then attempt to dynamically link in that library to obtain the subcontract.

So even though the program had no concept of replicated objects and was not initially linked with any libraries that understood replicated objects, we were able to dynamically obtain the right code to talk to a replicated file object.

This mechanism means that it is possible to add new subcontracts and use them to talk to old applications without changing either the old applications or the standard libraries, provided only that we can make a suitable subcontract library available at runtime to the old programs. This dynamic linking strategy is far from infallible.

Many domains, particularly systems servers, are reluctant to simply run some random dynamic library code nominated by a potentially malicious client. So, for security reasons the dynamic linker will only consent to load libraries that are on a designated directory search-path. So it typically requires intervention by a system administrator to install a new subcontract library in a standard directory which most domains will have on their search paths.

The Server Side

Many subcontracts support client server computing. The client side view of subcontract has been described, but for server based objects there is also a certain amount of machinery on the server side.

On the client side, the subcontract implementation is unavailable to application programmers. However on the server side, server implementations are allowed to be more tightly coupled to particular subcontracts. For example, a replicated subcontract may require special interfaces to the server application in order to support replication.

Thus the server side interfaces can vary considerably between subcontracts. However, there are three elements that are typically present: support for creating a Spring object from a language-level object, support for processing incoming calls, and support for revoking an object. A "language-level" object is one containing only a state and a set of methods.

Creating a Spring object

Subcontracts must provide a way of creating Spring objects from language-level objects. This can take one of two forms.

The simplest form is that a subcontract creates a normal client side Spring object. This means that it must create some kind of communication endpoint (for example a nucleus door) and fabricate a client side Spring object whose representation uses that endpoint.

However, some subcontracts provide special support for Spring objects that reside in the same address space as their server. For example the singleton subcontract provides an optimized invocation mechanism that can be used within a single address space. When a Spring object is created using such a subcontract it will typically fabricate an object using a special server-side operations vector and will avoid paying the expense of creating resources required for cross-domain communication. When and if the object is actually marshalled for transmission to another domain, the subcontract will finally create these resources.

Thus the singleton subcontract initially fabricates a Spring object using only a local C++ pointer to the server-state. Only when this object is marshalled for external transmission does singleton pay the expense of creating a nucleus door and marshaling the corresponding door id.

Processing Incoming calls

Occasionally a subcontract will create a communications endpoint that delivers an incoming call directly to the server side stubs. However, more commonly the subcontract will arrange that the incoming call arrives first in the subcontract and then will itself forward the call to the stub level.

This permits the server-side subcontract to maintain a dialogue with the corresponding client-side code by piggybacking additional information on calls and replies. For example a subcontract that supported replication might piggyback information on replies to advise clients on changes in the set of replicated servers, or on which server it would prefer the client to use.

Revoking an Object

Occasionally a server will decide that it wishes to discard a piece of state, even though there are clients who currently have objects pointing at that state. This is particularly important for operating system services which may wish to reclaim resources without waiting for all their clients to consent.

Thus typical server-side subcontracts provide a way for the server application to revoke an outstanding object. For example in the case of singleton this is implemented by revoking the underlying nucleus door, which will effectively prevent further incoming kernel calls.

Example Sub Contracts

The following is a short overview of some exemplary subcontracts. It should be understood by those skilled in the art that any particular one of these types are not required for the practice of the present invention and that many other types of subcontracts are conceivable. For brevity, simplified outlines of their key features are provided and descriptions of error conditions and special cases are omitted.

Note that in all cases the client application code merely performs simple spring object invocations, passing objects as arguments. All the machinery described is hidden in the subcontracts.

The Cluster Subcontract

The singleton subcontract uses a distinct kernel door for each piece of server state that may be exposed as a separate spring object. Since the kernel imposes a capability like security model on door identifiers, this is a good implementation for any objects that are used to grant access to distinctly protected system resources.

However some servers export large number of objects where if a client is granted access to any of the objects, it might as well be granted access to all of them. In this case it may reduce system overhead to be able to access a set of objects via a single door.

The cluster subcontract supports this notion. Each cluster object is represented by the combination of a door identifier and an integer tag. The cluster invoke_preamble and invoke operations conspire to ship the tag along to the server when performing a cross-domain call on the door. Similarly the marshal and unmarshal methods send and receive both the door identifier and the integer tag.

The Caching Subcontract

When a server is on a different machine from its clients, it is often useful to perform caching on the client machines. So when a cachable object is transmitted between machines, it is desirable that the receiving machine register the received object with a local cache manager and access the object via the cache.

The caching subcontract provides this functionality. The representation of a caching object includes a door identifier DI1 that points to the server and a door identifier DI2 that points to a local cache.

When we transmit a caching object between machines, we only transmit the DI1 door identifier. The caching unmarshal code presents the DI1 door identifier to a local cache manager and receives a new DI2. Whenever the subcontract performs an invoke operation it uses the DI2 door identifier. So all invocations on a cachable object go to a cache manager on the local machine. The use of this type contract is more fully described in co-pending application Ser. No.07/995,423, filed by Michael N. Nelson and Yousef A. Khalidi for A Method and Apparatus for a Cashing File Server, filed on the same day as this application, now U.S. Pat. No. 5,452,447, and which is hereby incorporated herein by reference.

The Recoverable Subcontract

Some servers keep their state in stable storage. If a client has an object whose state is kept in such a server it would like the object to be able to quietly recover from server crashes. Normal spring door identifiers become invalid when a server crashes, so we need to add some new mechanism to allow a client to reconnect to a server. Since normal door identifiers possess a capability like property, we would also like to have some way to convince the server that we are entitled to use a given piece of server state.

The recoverable subcontract uses a representation consisting of a normal door identifier, plus the name of a recovery manager, plus a cryptographically signed certificate. When a server passes a recoverable object out into the world, it creates a certificate describing the access this object is entitled to and signs it, using a conventional cryptographic signature.

Normally the recoverable invoke code simply does a simple door invocation on the door identifier. However if this fails the subcontract instead calls into the recovery manager presenting its certificate and requesting to be notified when the server recovers. When the server does reboot it contacts the recovery manager and, using the certificates to validate access, gives the clients new door identifiers so that they can resume operations.

The Replicon Subcontract

The replicon subcontract is an extremely simple subcontract for dealing with replicated services.

A replicon object's state consists of a vector of door identifiers. When it performs an invocation, it tries to issues a cross-domain invocation on each of the door identifiers in turn, until one of the invocation succeeds.

There are many of additional features that could be easily added to the replicon subcontract. For example, in addition to the vector of door identifiers one might keep track of a configuration tag for the current server configuration. Whenever a server invocation is performed this configuration tag could be transmitted. If the server wants to change the configuration (because servers have rebooted or because of load balancing) it can piggyback a new vector of door identifiers and configuration id onto the result buffer.

Reflections on Subcontract

One of the reasons that subcontract is effective is because is separates out the business of implementing objects from implementing object mechanisms. Subcontract implementors provide a set of interesting subcontracts that enable object implementors to chose from a range of different object policies without requiring that every object implementor must become familiar with the details of the object implementation machinery.

The set of operations that subcontract provides appear to be the right keys for obtaining control within a distributed environment By design, all the key actions taken on remote objects will involve the object's subcontract in one way or another.

In practice subcontract has succeeded in reducing the functionality that must be provided by the base system. A number of interesting new subcontracts have been implemented without requiring any new facilities in the base system.

The compatible subcontracts mechanism and the dynamic linking of subcontracts mean that new subcontracts can be introduced into the world and be exploited on old SPRING systems, without any changes to the existing operating system.

The Preferred Embodiment

In a preferred embodiment the subcontract mechanism described herein may be better understood by those skilled in the art by reference to the following listing of the interface definition code.

```
//
//For clarity the following coding examples omit error handling code. In
//practice many of the methods described would have additional code to
//check for error conditions and would raise appropriate exceptions if
//errors were encountered.
typedef int bool;
//
//The communication_endpoint class describes a communication endpoint
//that can be used for sending and receiving messages to remote machines.
    //Tell the subcontract to invoke the remote server.
    //We get a new message back containing the reply data.
    m = sc->invoke(m, 8);
    //There are no results.
    //We're done. Delete the reply message and return.
    delete m;
}
//Thus, a client who has obtained a C++ wombat object can perform
//operations on the object and the correct stubs and subcontract will be
//invoked, even though the subcontract may vary from wombat to wombat
main( )
{
    //The program now obtains an original wombat from some source
    //such as a nameserver...
    wombat *mother = name_service_lookup<wombat>("susie");
    // .. and can now perform wombat operations.
    wombat *child = mother->give_birth( );
    mother->meet(child, 0);
}
```

While the invention has been described in terms of a preferred embodiment in a specific operating system environment, those skilled in the art will recognize that the invention can be practiced, with modification, in other and different operating systems within the spirit and scope of the appended claims.

What is claimed is:

1. In an object oriented system wherein there exists client applications, objects, object type definitions, object implementations and servers, a spring object comprising:

a method table containing an entry for each operation implied by said spring object's type definition;

a subcontract mechanism coupled to said method table, the subcontract mechanism specifying which subcontract operations said spring object may perform, the subcontract mechanism comprising a client-side program mechanism for executing operation invocations on an object associated with said subcontract, and a server-side program mechanism associated with said client-side program mechanism for exchanging messages and for processing other operation calls initiated by said client-side program mechanism; and a data structure coupled to said subcontract mechanism, said data structure representing a subcontract's local private state.

2. A computer program product for use in a computer system having a memory, a processor, an input/output system, and a mechanism for communicating with distributed computer systems, the computer program product comprising a computer usable medium having computer readable program code mechanisms recorded therein which include:

a first spring object stored in the memory, said first spring object including program logic for executing a call from an application procedure to a first object which comprises a data structure, said first object referring to an object implementation of said first spring object, without said application knowing a location of said first object or a location of said first object's implementation and without said application knowing details of how arguments must be marshaled for calling said first object;

a stub program mechanism stored in the memory which comprises program logic to assist in executing calls on said first object by marshalling arguments for said first object into a communications buffer;

a plurality of client-side subcontract mechanisms, which comprise program logic to perform remote invocation of operation calls, wherein a spring object within an application can be associated with one of said plurality of client-side subcontract mechanisms; and wherein a client-side portion of said client-side subcontract mechanism is not required to have knowledge of types of said arguments being sent to said first object; and wherein said client-side portion of a subcontract mechanism has program logic to receive from said stub program mechanism a method identifier and a pointer to a communications buffer which contains arguments to be sent in a call to said first object, wherein said client-side portion of a subcontract mechanism has program logic to add additional data to said communications buffer to provide additional information to said first object and program logic to transmit selectively one of a parameter representing a pointer to said communications buffer and said communications buffer's contents to said first object.

3. The computer program product of claim 2 wherein the client-side portion of said one of said plurality of subcontract mechanisms comprises program logic to marshal information about its associated object into said communications buffer.

4. The computer program product of claim 2 wherein said program logic to selectively communicate one of said parameter representing a pointer to said communications buffer and said communications buffer's contents by said client-side portion of said one of said plurality of subcontract mechanisms comprises additional program logic to allow said client-side portion of said subcontract mechanism to:

transmit a copy of an object from one location to another; and transmit an object from one location to another.

5. The computer program product of claim 2 wherein a server-side portion of said one of said plurality of subcontract mechanisms comprises program logic to execute operation calls to create an object, and to revoke an object.

6. A subcontract mechanism for use in a distributed computer system, said computer system having a memory, a processor, an input/output system and a communications system for communicating with other computer systems, said subcontract mechanism comprising:

a first client-side mechanism which resides in a memory and which is distinct from a client-side stub and distinct from an object manager, said first client-side mechanism comprising program logic for executing operations under computer control on an object associated with said subcontract, wherein said object comprises a data structure, and wherein said first client-side mechanism further comprises program logic to execute calls on said object associated with said subcontract by marshalling arguments for said object, including a case wherein one of said arguments is itself an object, into a communications buffer and contains program logic to communicate selectively one of a pointer to said communications buffer and said communications buffer's contents to a second object, and wherein a second client-side mechanism associated with a different subcontract can be called to process said case wherein one of said arguments is itself an object; and a server-side mechanism which resides in a memory and which is distinct from a server-side stub and distinct from an object manager, said server-side mechanism comprising program logic to associate with said client-side mechanism for exchanging messages with said client-side mechanism and for processing operation calls from said client-side mechanism.

7. The subcontract mechanism of claim 6 wherein the first client-side mechanism comprises program logic to generate a new object, and to delete an object.

8. The subcontract mechanism of claim 6 wherein the first client-side mechanism comprises program logic to unmarshal information representing an object from said communications buffer to create a new object.

9. The subcontract mechanism of claim 6 wherein said program logic to selectively communicate one of a pointer to said communications buffer and said communications buffer's contents by said first client-side mechanism comprises additional program logic to:

transmit a copy of an object from one location to another; and transmit an object from one location to another.

10. In an object oriented system wherein there exists client applications, objects, stubs, object implementations, name registries, program code mechanism libraries, dynamic linker mechanisms and servers, computers containing memory, input/output devices and communications systems connected to other computer systems, a computer implemented method of processing an operation invoked on an object by a client residing in the memory of one of the computers wherein the operation invocation requires marshalling arguments which will permit program logic in an implementation of the object to execute the operation invoked thereon, and wherein one of said arguments may itself be an object, said method comprising the following steps:

receiving an operation invocation on an object in a computer memory by a client-side stub of said object, said object comprising a data structure;

transforming the operation invocation into an operation call on one of a plurality of subcontracts where different objects within a single application can have different subcontracts associated with said different objects, said transformation comprising the following steps;

determining by the client-side stub whether said operation invocation requires any arguments to be marshalled;

marshaling said arguments into a communications buffer by performing the steps of;

determining by said client-side stub whether any of said arguments to be marshaled is an object;

calling a second subcontract associated with said object which is an argument;

directing said second subcontract associated with said object which is an argument, to marshal said object which is an argument;

receiving said marshaled object from said second subcontract by said client-side stub; and marshaling any non-object arguments along with said marshaled objects into said communications buffer;

passing a pointer to said communications buffer to a first subcontract which is associated with said object on which said client invoked said operation;

executing said operation call on said one of a plurality of subcontracts; and returning a result by said one of a plurality of subcontracts to the client-side stub of said object, whereby an operation invocation on an object which requires marshalling arguments which will permit program logic in an implementation of the object to execute the operation invoked thereon, and wherein one of said arguments may itself be an object, has been efficiently performed.

11. The method of claim 10 comprising the additional step of the first subcontract, which is associated with said object on which said client invoked said operation, executing program logic in said memory to transmit said operations call with the associated communications buffer, to an implementation of the object on which said client invoked said operation.

12. The method of claim 10 comprising the additional steps of a server-side third subcontract, which is associated with said first subcontract, executing program logic in a memory to receive said operations call with the associated communications buffer, and to pass said operations call with the associated communications buffer to a server-side stub which is associated with said implementation of the object on which said client invoked said operation.

13. The method of claim 12 comprising the additional steps of said server-side stub executing program logic to unmarshal said communications buffer, and to pass said operations call and associated unmarshaled arguments to said object implementation.

14. The method of claim 13 comprising the additional steps of said object implementation executing program logic for executing said received operations call, and passing any results and any related arguments back to said server-side stub for relay to said client.

15. The method of claim 14 comprising the additional steps of said server-side stub executing additional program logic in a memory for marshaling any arguments of said results into a return communications buffer, communicating selectively one of a parameter representing a pointer to said return communications buffer and said return communications buffer's contents to said third subcontract, and said third subcontract executing program logic for selectively transmitting said one of a parameter representing a pointer to said return communications buffer and said return communications buffer's contents back to said calling first subcontract.

16. The method of claim 15 comprising the additional steps of said first subcontract executing program logic in a memory for communicating selectively one of a parameter representing a pointer to said return communications buffer and said return communications buffer's contents to said client-side stub, said client-side stub executing program logic for unmarshalling said return communications buffer's contents, and passing said results and related unmarshaled arguments to said client.

17. The method of claim 16 wherein said step of said client-side stub unmarshaling said return communications buffer's contents comprises the additional steps of:

executing program logic in a memory for determining by said client-side stub whether any of said arguments to be unmarshaled is an object;

if an argument to be unmarshaled is an object, directing said first subcontract to unmarshal said object which is an argument of said results;

receiving said unmarshaled object from said first subcontract by said client-side stub;

unmarshaling any non-object arguments of said return communications buffer; and collecting all unmarshaled results arguments together for return to said client.

18. The method of claim 17 wherein said step of directing said first subcontract to unmarshal said object which is an argument of said results, comprises the steps of:

executing program logic in a memory for calling said first subcontract to unmarshal said object which is an argument to be unmarshaled;

said first subcontract checking the returned communications buffer to determine a subcontract identifier for said object to be unmarshaled;

said first subcontract sending said subcontract identifier to a subcontract name registry requesting said registry to unmarshal the object to be unmarshaled;

said registry identifying a fifth subcontract as being associated with said object to be unmarshaled, and directing said fifth subcontract to unmarshal the object to be unmarshaled; and said fifth subcontract returning said unmarshaled object to said first subcontract.

19. The method of claim 18 wherein said step of said registry identifying a fifth subcontract as being associated with said object to be unmarshaled, comprises the steps of:

executing program logic in a memory for checking said registry to determine if a subcontract associated with said subcontract identifier is contained in said registry;

constructing a shared library filename based upon said subcontract identifier;

calling a dynamic linker program mechanism to link a program code mechanism identified by said shared library filename based upon said subcontract identifier to said registry, said program code mechanism identified by said shared library filename based upon said subcontract identifier being said fifth subcontract;

calling said fifth subcontract to unmarshal said object to be unmarshaled; and said fifth subcontract returning said unmarshaled object to said first subcontract.

20. The method of claim 15 wherein said step of said server-side stub marshaling any arguments of said results into a return communications buffer comprises the additional steps of executing program logic for determining by said server-side stub whether any of said arguments to be marshaled is an object;

calling a fourth subcontract which is associated with said object which is an argument of said results;

directing said fourth subcontract associated with said object which is an argument, to marshal said object which is an argument of said results;

receiving said marshaled object from said fourth subcontract by said server-side stub; and marshaling any non-object arguments of said results along with said marshaled objects into said return communications buffer.

21. In a distributed computer system having a computer which has a memory, an input/output system, and a communications system for communicating with other computers in the distributed system, and having an object oriented system wherein there exists client applications, objects, stubs, object implementations and servers, a computer implemented method for communicating messages between a client application and a server, wherein the messages include arguments, at least one element of which includes an object, said method comprising the following steps:

executing program logic in a memory for generating an operation invocation on a local object by a client application, said object comprising a data structure;

receiving said operation invocation by a client-side stub of said object;

marshaling arguments associated with said operation invocation into a communications buffer, said marshalling operation comprising the steps of;

determining whether any of the arguments to be marshaled is an object;

for each object which is an argument to be marshaled, identifying one of a plurality of subcontracts which is associated with said object to be marshaled;

using said identified subcontract which is associated with said object to be marshaled, marshal said object which is being used as an argument to be marshaled into a communications buffer; and returning a completion signal to said client-side stub;

transforming said operation invocation into an operation call on a client-side subcontract by said client-side stub, said client-side subcontract being one of a plurality of subcontracts;

using said client-side subcontract to transmit said operation invocation and associated communications buffer from said client application to said object's implementation;

using said client-side subcontract to receive a reply from said object's implementation, and to deliver a return communications buffer to said client-side stub;

unmarshalling said results and returned communications buffer by said client-side stub; and making said results available to said client application.

22. In a distributed computer system comprising a computer having a memory, an input/output system, and a communications system for communicating with other computers in the distributed computer system, and having a variety of different kinds of objects, and a set of subcontract identifiers, where each subcontract mechanism is identified by a subcontract identifier, a computer implemented method for unmarshalling an object from a communications buffer comprising the steps of:

Executing program logic in a memory for unmarshalling a subcontract identifier from said communications buffer by a first subcontract mechanism, said first subcontract mechanism being one of a number of different subcontract mechanisms for communicating with remote objects, where each different subcontract mechanism comprises a set of program logic procedures for performing at least object marshaling, object unmarshalling and object invocation;

using a subcontract registry to locate a set of program logic procedures that implements a second subcontract mechanism which is identified by said subcontract identifier by performing the additional steps of:

executing program logic for checking said registry to determine if a subcontract mechanism associated with said subcontract identifier is contained in said registry;

constructing a shared library filename based upon said subcontract identifier; and calling a dynamic linker program mechanism to link a program code mechanism to said registry, said program code mechanism being identified by said shared library filename based upon said subcontract identifier, said program code mechanism identified by said shared library filename based upon said subcontract identifier being said subcontract mechanism associated with said subcontract identifier;

selecting an unmarshal procedure from said set of procedures that implements said second subcontract mechanism;

performing a local procedure call to said unmarshal procedure to perform unmarshalling of said object; and unmarshalling said object by unmarshalling data and communications information that is appropriate to said second subcontract mechanism.

* * * * *